March 16, 1954     O. B. GUNBY     2,672,074
VARIABLE SPEED FILM PRINTER
Filed April 12, 1951
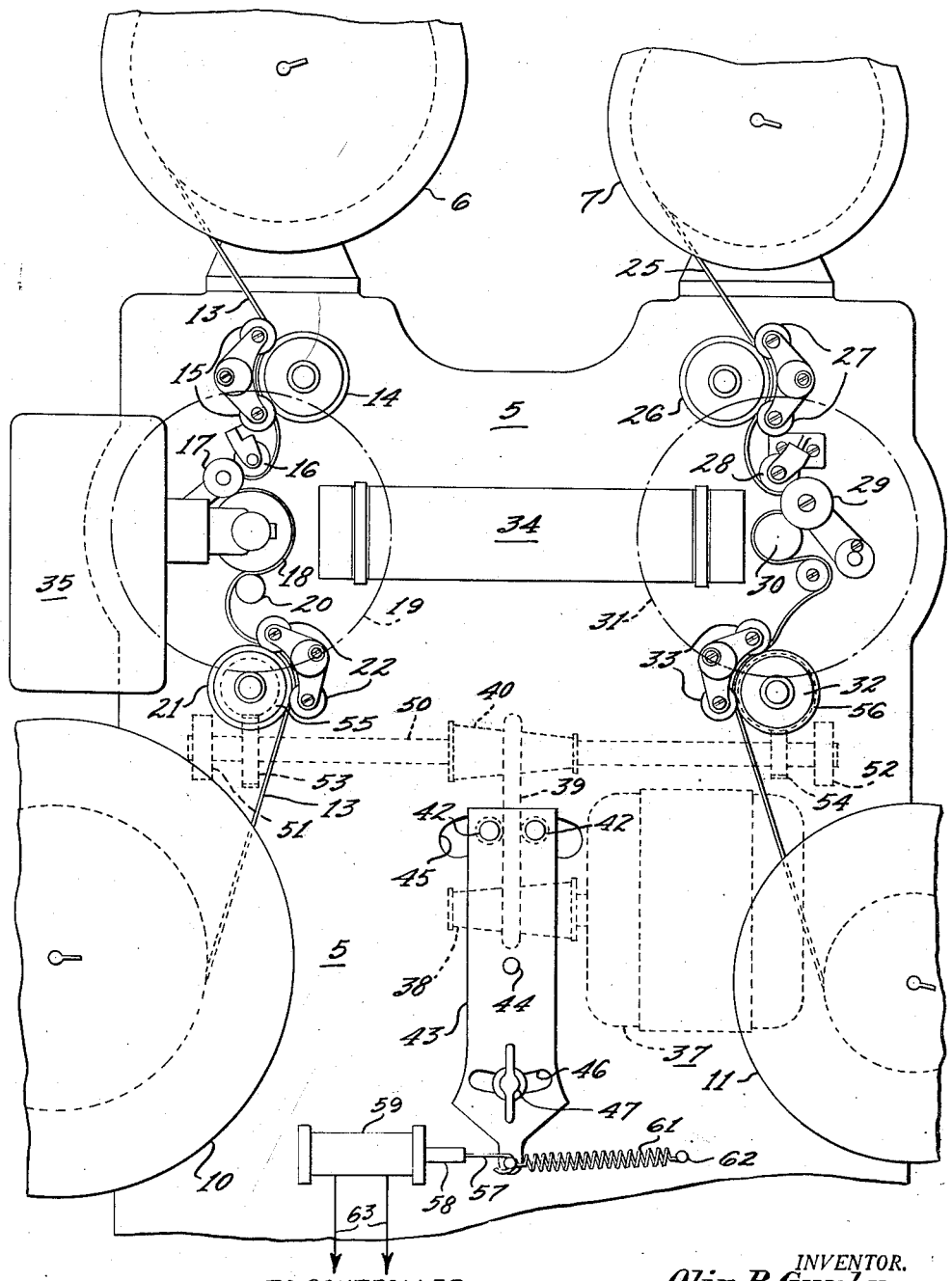
TO CONTROLLER
INVENTOR.
Olin B. Gunby
BY
*Orl R. Goshaw*
ATTORNEY.

Patented Mar. 16, 1954

2,672,074

UNITED STATES PATENT OFFICE 2,672,074

VARIABLE SPEED FILM PRINTER

Olin B. Gunby, Los Angeles, Calif., assignor to Radio Corporation of America, a corporation of Delaware Application April 12, 1951, Serial No. 220,578

1 Claim. (Cl. 88—24)

This invention relates to film printers, and particularly to the optical types of printers for transferring images of either pictures or sound tracks from one film to another. This printer is of the type shown in Collins U. S. Patent No. 2,194,542 of March 26, 1940.

The printers of the type shown in the above mentioned patent use a light source for illuminating the negative film, the emergent light being projected to the positive film for making copies of the sound track or picture. Prints of pictures and sound tracks are also made by the contact method, whereby the negative and positive have their emulsions in contact and light is impressed on the negative. As the negative film roll is usually made up of different picture sequences which are daylight scenes of different average densities or night scenes requiring a certain print density, the exposure of the print must be varied. This has been done in the past by varying the light intensity of changing the voltage on the light source. Sound track sequences also varied in average level, and in film sound track printers, the average sound level may be and is shifted by changing the printing light intensity so that all the sequences on the print have substantially the same average level. In some instances, the voltage to the lamp is varied between 80 and 115 volts.

In the present invention, a printer of the type shown in the above mentioned Collins patent is used, but one wherein the speed of the films is varied to obtain the desired exposure of the positive raw stock. Since exposure is the product of time and intensity, the present invention utilizes a constant intensity, but varies the time of exposure.

There are several advantages in varying the speed rather than the voltage on the printing lamp. One of these is that, since the lamp is burned at a constant intensity at all times, the color value of the light provided remains constant, thus providing true tone value, particularly when printing color pictures. When the lamp intensity is varied, the color spectrum of the light therefrom changes.

It is also possible for an operator to print substantially twenty-five percent or more film in a given period of time, since most of the material to be printed can now be exposed properly at voltages considerably below 110 or 115 volts, and this reserve in illumination can be exchanged for greater footage of exposed film per unit period.

Also, a printer in accordance with the invention will have greater flexibility than present printers, in that the variable speed transmission can be made to run a printer at a slower than conventional speed. This permits the use of less sensitive film stocks than could be used successfully with present printers without operating the exposure lamp at some value above its rating. Lamps operating above rating deteriorate rapidly and are subject to burn-outs with possible damage to film being printed.

The invention may utilize either a manual control or an automatic control from a pre-set resistance board, such as disclosed in Kreuzer U. S. Patent No. 2,320,524 of June 1, 1943.

The principal object of the invention, therefore, is to facilitate the printing of images on photographic film, either picture or sound track.

Another object of the invention is to provide an improved photographic film printer of the optical projection type.

A further object of the invention is to provide an improved printer wherein the print stock may be variably exposed by varying the time of exposure.

A still further object of the invention is to provide an optical printer wherein the print stock may be variably exposed by varying the speed of advancement of the films with a light source of constant intensity.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a front elevational view of a printer embodying the invention.

Referring now to the drawing, there is provided a mounting frame plate 5 on top of which is a negative supply reel 6 and a positive print stock supply reel 7. Mounted at the lower end of the panel 5 is a take-up reel 10 for the negative and a take-up reel 11 for the print stock. The negative 13 is advanced by a sprocket 14 under pad rollers 15, then around a guide roller 16, around a pressure roller 17, over a speed stabilizing drum 18 having a flywheel 19 on the shaft thereof, around a guide roller 20, and over an advancing sprocket 21 having pad rollers 22.

The positive film 25 is advanced over a similar path, which includes a sprocket 26, pad rollers 27, a guide roller 28, a pressure roller 29, a film speed stabilizing drum 30 having a flywheel 31 on the shaft thereof, and sprocket 32 with its pad rollers 33.

An optical unit 34 is provided for projecting light emerging from the negative film 13 to the print stock 25, the light being supplied from an exciter lamp in the housing 35, as described in detail in the above mentioned Collins patent.

Power for the film advancing mechanisms is obtained from a motor 37 having a tapered pulley 38 mounted on its shaft. The pulley 38 is belted by a belt 39 to a tapered pulley 40, the taper of the pulley 40 being in the opposite direction to the taper of the pulley 38. The belt 39 passes between two rollers 42 mounted on a belt shifting member 43 pivoted at 44, the rollers 42 moving in the arcuate slot 45 in the panel 5.

The other end of the member 43 is provided with an arcuate slot 46, through which passes a winged nut bolt 47 so that movement of the lower end of the member will shift the belt 39 axially along the pulleys, the pulley 40 being driven at a less speed when the belt is in the left-hand position, and at a greater speed when the belt is in the right-hand position. The winged nut bolt permits the belt shifting member 43 to be locked in position, if desired.

The pulley 40 is mounted on a shaft 50 mounted in bearings in bosses 51 and 52 and on which are drive gears 53 and 54, respectively. These gears are in mesh with sprocket driving gears 55 and 56 for driving the sprockets 21 and 32. Through other gearing, not shown, the upper sprockets 14 and 26 are also driven.

Thus, if the print stock requires more exposure, the film advancing mechanisms are slowed down by moving the belt 39 to the left to the degree necessary, while if the film exposure is to be decreased, the belt 39 is moved to the right to increase the speed of film passage through the printer. It is to be understood that the intensity of the lamp in the housing 35 remains constant at all times as well as the speed of the motor 37.

The lower end of the member 43 is attached by a rod 57 to the end of an armature 58 of a solenoid 59. Co-axially with the rod 57 and armature 58 and connected to the lower end of member 43, is a spring 61 anchored at 62. Conductors 63 lead to a step-by-step resistance controller, such as shown in the above mentioned Kreuzer patent. Thus, if the negative film 13 has been notched to operate micro-switches along the edge of the film at the proper times, a resistance control board will vary the current to the solenoid 59 to shift the belt 39 along the pulleys 38 and 40. Thus, the speed of advancement of the negative and positive films through the printer will be controlled in accordance with the exposure desired for the positive, which exposure has been predetermined. During this operation, the winged nut 47 is loosened.

Although a solenoid operated device and a tapered speed control unit is disclosed, it is to be understood that other forms of such devices may be used, depending upon the fineness of light exposure variations required.

I claim:

An optical film printer comprising sprocket means for advancing a negative film, a second sprocket means for advancing positive raw stock, an exposure lamp of constant intensity, optical means for projecting light of constant intensity on said negative film, light emerging from said negative film being impressed on said positive print stock, optical means for projecting said light emerging from said negative film on said positive print stock, a constant speed motor, an interconnecting drive means between said motor and both of said sprocket means for driving both of said sprocket means simultaneously, said interconnecting means including a speed changing means for said sprocket, said speed changing means including a pulley driven by said motor and having a taper in a certain direction, a second tapered pulley in said common interconnecting drive means and having a taper in the opposite direction, a belt interconnecting said tapered pulleys, a belt shifting member for shifting the belt along said pulleys axially, and locking means for said belt shifter for maintaining a constant speed when said negative film has a constant density, a solenoid being connected to said belt shifting member for shifting said belt axially along said pulleys in accordance with the amount of energization of said solenoid.

OLIN B. GUNBY.

References Cited in the file of this patent

UNITED STATES PATENTS

| Number | Name | Date |
|---|---|---|
| 976,164 | Goldstein | Nov. 22, 1910 |
| 2,093,785 | Sullivan | Sept. 21, 1937 |
| 2,147,532 | Johnson | Feb. 14, 1939 |
| 2,194,542 | Collins | Mar. 26, 1940 |
| 2,243,047 | Foster | May 20, 1941 |
| 2,243,048 | Foster | May 20, 1941 |